Dec. 7, 1937.  F. P. MILLER  2,101,085
INSERTED BLADE CUTTER
Filed March 31, 1934
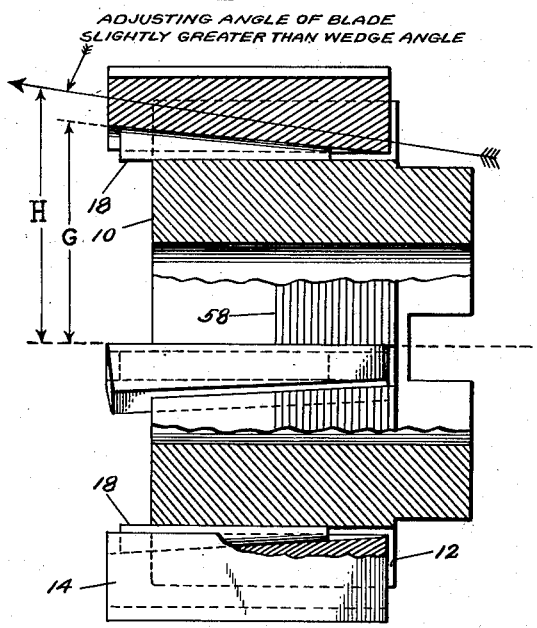
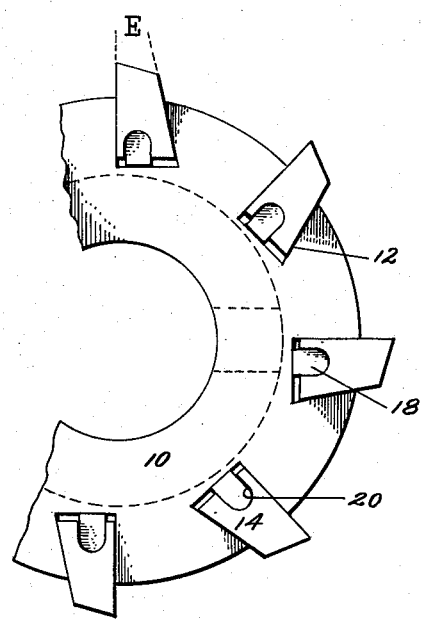
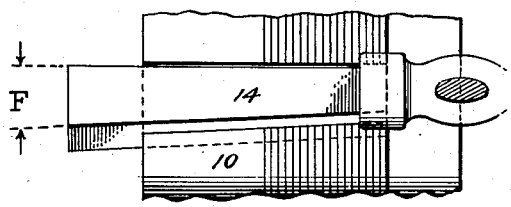
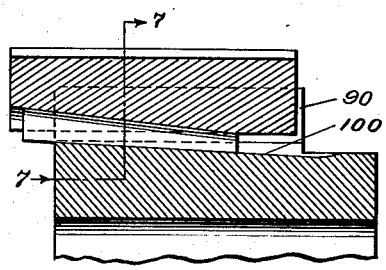
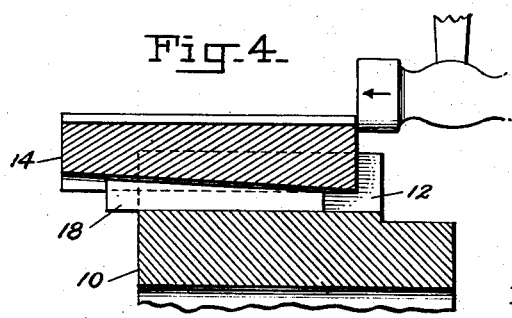
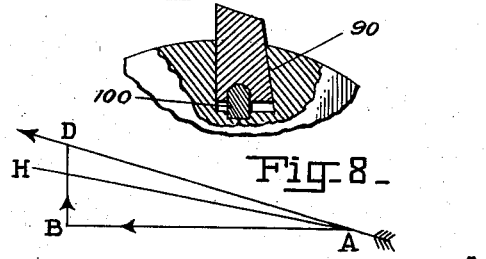
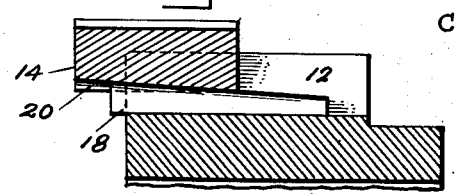
INVENTOR
FRANK P. MILLER Patented Dec. 7, 1937

2,101,085

UNITED STATES PATENT OFFICE 2,101,085

INSERTED BLADE CUTTER

Frank P. Miller, Meadville, Pa.

Application March 31, 1934, Serial No. 718,485

4 Claims. (Cl. 29—105)

This invention relates to cutting tools of the inserted blade type.

It is, of course, old in this art to provide an inserted blade cutter having a blade adjusting line disposed at an acute angle to the longitudinal axis of the blade carrier so that by moving the blade endwise and outwardly along this line, provision is made for wear due to use and grinding.

This angular blade adjusting line may be produced in several ways. For example, the blade receiving slot may have a compound taper; that is, longitudinal and radial tapers, allowing the blade to be adjusted endwise and radially outward to compensate for wear. In some such cutters, the blades are held in their advanced and outwardly adjusted positions through the addition of shims and since it is required that these shims be of predetermined thickness to provide the exact amount of adjustment necessary, it will be seen that various combinations of shims must be maintained on hand and that the accurate adjustment of the cutter, especially when the cutter embodies a number of blades, is a time consuming and tedious task.

With an appreciation of the foregoing, the invention will be found to contemplate an inserted blade cutter in which the previously discussed line of blade adjustment is in diverging relation to the active surface of the blade lifting or wedging means, of whatever nature the latter happens to be, such divergence being in the direction of the cutting end of the tool, producing in effect, jaws converging in the direction of the rear end of the tool and clamping the intervening tapering mass of blade metal against rearward shifting and thus holding the blade securely in adjusted position while at the same time permitting the blade to be driven forwardly and thus released for resetting or other purposes.

When the invention is carried out in a cutter embodying a separate though initially present blade lifting wedge, the line of blade adjustment will be found to diverge from the blade engaging surface of the wedge in the direction of the cutting end of the tool, so that even though the endwise driving of the blade to release the same causes the blade to climb the wedge, the blade is, nevertheless, loosened from binding engagement by the wedge and other restraining means associated therewith, after which the blade may be either removed entirely or advanced to a new cutting position compensating for wear and regrinding.

To provide easy release of the blade by simply driving endwise thereon is quite advantageous. First, this facilitates the adjusting operation and second makes it unnecessary in the design of the tool, to provide a means, such as an opening, by which the wedge may be struck from the small end thereof and thus released.

By way of further brief reference to the invention, it is pointed out that the body of the cutter is formed with a plurality of spaced parallel peripheral or circumferential lines intersecting the blade receiving slots and cooperating with the ends of the blades or with marked portions of the blades, in forming an ever-present scale which may be used for the separate and yet co-extensive adjustment of the blades, it being apparent that the nature of the tool requires that the several blades be adjusted separately and yet co-extensively for re-grinding.

Other objects and advantages will be apparent during the course of the following description.

In the accompanying drawing forming a part of this application and in which like numerals are employed to designate like parts throughout the same, Figure 1 is a vertical sectional view through a rotary cutter embodying the invention, parts being shown in elevation, Figure 2 is a fragmentary front elevation of a rotary cutter embodying the invention, Figure 3 is a detail longitudinal sectional view through the improved cutter, the view illustrating the manner in which the blade may be driven endwise in the direction of the cutting end thereof and thus loosened, Figure 4 is a fragmentary side elevation illustrating the manner in which the blade may be driven endwise in the direction of the cutting end thereof and thus loosened, Figure 5 is a detail longitudinal sectional view illustrating the blade in position after having been several times adjusted and reground, Figure 6 is a detail longitudinal sectional view through a slightly modified form of cutter, Figure 7 is a detail transverse sectional view taken on line 7—7 of Figure 6, Figure 8 is a diagram illustrating one manner of producing a desired blade adjusting angle.

In the drawing, particularly Figures 1 to 5, the numeral 10 designates a carrier or body such as is employed in a reamer, although as will appear, the invention forming the subject of this application has special reference to the blade mounting and may, therefore, be carried out in connection with other types of cutters such, for example, as milling cutters, counter-bores, and boring heads.

As shown in Figure 1, the body or support 10 is formed with an annular series of spaced approximately longitudinal slots 12 opening out through the periphery and ends of the body for the detachable reception of blades 14. The mounting of the blades will be found to provide for the expeditious and coextensive adjustment of the blades and for the firm support of the blades in the successively advanced positions thereof, even though wear and grinding has reduced greatly the bearing or attaching areas of the blades. Thus, maximum use is derived from the relatively expensive metal forming the blades.

As further illustrated in Figure 1, the side walls of the slots 12 diverge in the direction of the forward ends of the blades and, as shown in Figure 2, the side walls 12 also converge radially in the direction of the periphery of the carrier.

In other words, the pairs of side walls of the slots 12 are angled longitudinally and radially, producing a compound taper. Likewise, the side walls of the blades 14 have tapers complemental to the angles of the side walls of the slots. More specifically, the side walls of the blades diverge in the direction of the forward or cutting ends of the blades and the side walls of the blades converge radially in the direction of the outer longitudinal edges thereof. The angle thus produced between the side walls of the blades are complemental to the angles of the side walls of the slots so that the blades have firm uniform pressure contact with the side walls of the slots in the successively advanced positions of the blades.

Hence, to adjust the blades to new cutting positions or to a greater cutting diameter, the blades are moved forwardly and outwardly in the direction of the cutting ends thereof; this adjustment in itself and the compound taper of the slots and the complemental angles of the side walls of the blades being well known to those versed in this art.

For example, by comparison of my disclosure with the matter shown in the patents to Severson 1,924,887 and Gairing, 1,648,802, it will be seen that each provides for the adjustment of a particular blade in a line disposed at an acute angle to the longitudinal axis of the tool. In other words, in each disclosure, the line of blade adjustment extends diagonally of the longitudinal axis of the carrier or at an acute angle to the longitudinal axis of the blade slot.

Beneath, or in operative relation to each blade, there is a wedge 18 and an important phase of the invention has to do with the relation of the angle of the blade engaging surface of this wedge to the line of adjustment of the blade. That is to say, the invention contemplates the use of a predetermined adjusting angle in concert with a wedge in which the lift thereof bears a relation to the adjusting angle which, while providing for the firm mounting of the blade at all positions thereof and for the repeated and expeditious adjustment of the blade, at the same time looks to the easy release of the blade for the purpose of adjustment or removal.

By way of specific reference to the wedge 18, it is pointed out that the same is introduced in the slot 12 from the forward or cutting end of the body or carrier 10 and is engaged with the bottom wall of the slot and the opposed edge or wall of the longitudinally extending groove 20 in the blade.

From Figure 1 it will be seen that by driving the wedge 18 in the direction of the diametrically reduced end thereof, the associated blade will be forced outward into uniform pressure engagement with the converging side walls of the slot so as to lock in place the blade.

In explaining this relation between the blade adjusting angle as indicated by the arrow in Figure 1, and the lift of the wedge, it is pointed out that the angle F between the side walls of the slot is preferably from one to three degrees while the angle E between the radially converging walls of the slot is preferably between 8 and 12 degrees, producing a blade adjusting angle which provides the proper proportions of radial and endwise adjustment of the blade. For example, in most cases it is desirable to have greater endwise adjustment of the blade than the concurrent radial adjustment to provide for greater wear on the end of the blade.

Coming now to the angle or lift of the wedge 18, attention is invited to Figure 1, in which it is illustrated that the blade lifting or wedging surface of the wedge 18 forms the angle "G" with the longitudinal axis or other given line of the cutter. The angle "G" is preferably not more than six or seven degrees while the angle "H" representing the adjusting angle of the blade is somewhat greater, a matter of possibly one degree.

By reason of the difference between the adjusting angle H and the wedge angle G, such angles diverge in the direction of the cutting end of the tool making it possible to drive the blade in the direction of the cutting end of the tool and thus release the blade from binding engagement by the wedge.

By the same token, the angles G and H converge in the direction of the rear end of the tool so that when the wedge is in the position shown in Figure 1 it holds the blade in firm pressure contact with the plurally tapered walls of the slots to inhibit shifting of the blade.

With further reference to the manner in which the blade may be released for the purpose of adjustment or for renewal, it is pointed out that when the blade is driven forward, such movement will be in the direction of the flare of the slot, this flare being both radial and longitudinal thereby allowing the blade to climb the wedge 18 and assume the positions clearly disclosed in Figures 3 and 4. Since the blade 14 is driven into a part of the slot that widens as suggested by the angles E and F, no corresponding movement of the wedge 18 is required.

To reset the blade, it is simply necessary to place the blade in its intended position and then push or gently tap the wedge back into engagement with the opposed surfaces of the blade and slot and thus lift the blade and secure it in engagement with the side walls of the slot. Then, by driving back on the blade it will be forced into rigid locking position without further driving on the wedge. In like manner, it is not necessary to drive on the small end of the wedge to loosen it, since the entire assembly can be loosened by simply driving forward on the blade alone. In this connection it is pointed out that in some wedge constructions it has been necessary to drill holes through the carrier in order to provide access to the small end of the wedge so that a drift pin can be inserted in these holes so as to loosen the wedge.

This, of course, is obviated in my construction and the design is thus simplified.

The blade fastening and adjusting means disclosed in Figures 1 to 5, provides for numerous successive adjustments of the blades without coextensive shifting of the wedges. This maintains the wedge in supporting engagement with a substantial portion of the blade at all positions of adjustment. In Figure 1 it is illustrated that for its full length, each wedge is initially in supporting engagement with the associated blade while in Figure 5 there is a showing that the blade after numerous successive adjustments is engaged by a substantial portion of the blade. In fact, the wedge is shown to be in full supporting engagement with that portion of the blade between the ends of the slot and in supporting engagement with a portion of the blade projecting beyond the forward end of the slot.

The relatively small endwise movement necessary on the part of the wedge to provide for greater adjustment on the part of the blade is due to the slight difference in the angles G and H. A substantial difference in the angles G and H would necessitate a greater endwise movement on the part of the wedge to compensate for numerous successive adjustments of the blade.

It is further illustrated in Figure 5 that even though a substantial portion of the blade has been consumed by wear and grinding, relatively large portions of the attaching or bearing areas of the blade remain in firm and uniform pressure contact with the wedge and the opposed walls of the slot so that provision is made for the maximum use of the relatively expensive material forming the blade.

Attention might be invited to Figure 8 showing diagrammatically the relation between the adjusting angle of the blade and the lifting angle of the wedge. In this figure, "C—L" is the longitudinal axis or other given line of the carrier. "A—B" represents the forward movement of the blade. It is clear that as the blade is moved forwardly it will be released from binding engagement by the longitudinally tapered side walls of the slot. In order for the blade to again have firm engagement with the radially converging side walls of the slot, such blade must move radially outward as represented by "B—D".

Thus, the forward movement of the blade as represented by A—B and the radial movement of the blade as represented by B—D produces a mean-adjusting angle A—D corresponding to the arrow in Figure 1. The line A—H in Figure 8 represents the edge of the wedge which supports and contacts the blade.

It is clearly shown in Figure 8, that the adjusting angle A—D is slightly greater than the lifting angle of the wedge as represented in Figure 8 by the line A—H. Therefore, as the blade moves forwardly and radially along the line A—D it becomes disengaged from its contact with the wedge along the line A—H. This explains why the blade is loosened from its locked position by being driven forward and without driving on the wedge itself or without movement of the wedge. This also explains why the backward end thrust of the blade due to the cutting strain is completely absorbed by the difference in angles. In other words, as the blade would tend to move backward along the line A—D, it finds itself inhibited from its backward movement because it is in rigid contact wth the wedge along the line A—H and is held against rearward movement by the radial taper E, and the longitudinal taper F of the side walls.

In other words, the solid mass of metal between A—H and A—D is shown to be increased in depth toward the forward end of the cutter so as to inhibit backward movement of the blade when the wedge is in position. This also explains why the blade can be rigidly tightened in position without backward driving on the wedge. That is to say, it is only necessary to push or tap the wedge into mild contact with the blade and the bottom wall of the slot, after which the blade is driven back into pressure contact with the walls of the slot, so as to establish rigid binding engagement between the side walls of the slot and the blade.

From the foregoing it will be seen that one of the important features of the invention has to do with the relation of the line of adjustment of the blade to the lift of the wedge, such relation making it possible to hold firmly the blade in adjusted position, to loosen the blade by simply tapping it endwise and to avoid the use of auxiliary or additional shims or combinations of shims for successive blade adjustments.

By reference to Figure 1, it will be seen that the periphery of the body 10 is formed with a plurality of spaced, parallel, circumferential lines 58 disposed at right angles to the longitudinal axis of the cutter and intersecting the slots 12 to co-operate with the rear ends of the blades or with marked portions of the blades in defining an ever-present scale by which the blades may be adjusted co-extensively and yet separately.

As brought out, the invention contemplates the individual adjustment of the blades, and it has been found that the scale provides for the individual and co-extensive adjustment of the blades with facility and accuracy without resorting to the use of extraneous measuring devices.

In the form of invention shown in Figure 6, the bottom wall of the slot 90 may be formed with a longitudinal groove 100 in opposed relation to the groove in the bottom or inner edge of the blade. The bottom wall of the groove 100 may be at an angle of 3 or 4 degrees to the main bottom wall of the blade slot and makes possible a steeper angle in the groove in the bottom of the blade without using a wedge having an angle so steep that the wedge would be likely to loosen under vibration incident to use, it being noted in this connection that a wedge having more than 6 or 7 degrees taper is likely to jar loose.

Having thus described the invention what is claimed is:

1. In an inserted blade cutter, a carrier having a slot, a blade in said slot and having a cutting end portion, a wedge in said slot and disposed beneath and in lifting relation to the blade, said slot and said blade being formed with complemental side walls diverging in the direction of the cutting end portion of the blade and converging radially outward to define a blade adjusting line at an acute angle to the longitudinal axis of the body, said wedge being formed with a lifting angle less than the angle of the blade adjusting line with respect to the longitudinal axis of the body.

2. In an inserted blade cutter, a carrier having a slot, a blade in said slot and having a cutting end portion, a wedge in said slot and disposed beneath and in lifting relation to the blade and having a predetermined lifting angle, said slot and said blade being formed with complemental side walls diverging longitudinally in the direction of the cutting end portion of the blade and converging radially outward to define a blade adjusting line at an acute angle to the longitudinal axis of the body, said wedge being formed with a lifting angle less than the angle of the blade adjusting line with respect to the longitudinal axis of the body, and included in said first named angle thereby causing the wedge to occupy a position in diverging relation to the blade adjusting line of the cutting end portion of the blade.

3. In an inserted blade cutter, a carrier having a slot, a blade in said slot and having a cutting end portion, said blade and said slot having side walls diverging in the direction of the cutting end portion of the blade and converging radially outward thereby defining a blade adjusting line at an acute angle to the longitudinal axis of the body, and a blade locking wedge beneath and engaging the blade and diminished in thickness in the direction opposite the cutting end portion of the blade to form a blade lifting angle, the blade lifting angle being less than the angle of the blade adjusting line with respect to the longitudinal axis of the slot, and being included in said angle.

4. In an inserted blade cutter, a carrier having a slot, a blade in said slot and having a cutting end portion, a wedge in said slot and disposed beneath and in lifting relation to the blade and having a predetermined blade lifting acute angle, said slot and said blade being provided with complemental side walls diverging longitudinally toward the cutting end portion of the blade on an angle less than the lifting angle of said wedge, said side walls being in radially converging relation on an angle greater than the lifting angle of said wedge thereby defining a blade adjusting line at an angle to the longitudinal axis of the slot greater than the lifting angle of the wedge and at an acute angle to the longitudinal axis of the slot allowing the blade to be driven in the general direction of the wider end of the wedge and thus freed, said blade being provided with a groove receiving said wedge and increased in depth toward the cutting end of the blade.

FRANK P. MILLER.